United States Patent
Suh et al.

(10) Patent No.: US 11,546,759 B2
(45) Date of Patent: Jan. 3, 2023

(54) METHOD AND DEVICE FOR COMMUNICATING IN WIRELESS COMMUNICATION SYSTEM

(71) Applicant: SAMSUNG ELECTRONICS CO., LTD., Gyeonggi-do (KR)

(72) Inventors: Kyungjoo Suh, Gyeonggi-do (KR); Kisuk Kweon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 4 days.

(21) Appl. No.: 17/255,713

(22) PCT Filed: Jun. 27, 2019

(86) PCT No.: PCT/KR2019/007831
§ 371 (c)(1),
(2) Date: Dec. 23, 2020

(87) PCT Pub. No.: WO2020/004986
PCT Pub. Date: Jan. 2, 2020

(65) Prior Publication Data
US 2021/0274346 A1    Sep. 2, 2021

(30) Foreign Application Priority Data
Jun. 29, 2018  (KR) ........................ 10-2018-0076081

(51) Int. Cl.
| H04L 9/06 | (2006.01) |
| H04L 9/30 | (2006.01) |
| H04W 12/06 | (2021.01) |
| H04W 12/106 | (2021.01) |
| H04W 8/24 | (2009.01) |
| H04W 60/00 | (2009.01) |

(52) U.S. Cl.
CPC ............ *H04W 12/06* (2013.01); *H04W 8/24* (2013.01); *H04W 12/106* (2021.01); *H04W 60/00* (2013.01)

(58) Field of Classification Search
None
See application file for complete search history.

(56) References Cited

U.S. PATENT DOCUMENTS

| 2007/0297611 A1 | 12/2007 | Yun et al. |
| 2011/0038480 A1 | 2/2011 | Lin |

(Continued)

FOREIGN PATENT DOCUMENTS

| KR | 1020060042045 | 5/2006 |
| KR | 1020180049211 | 5/2018 |

OTHER PUBLICATIONS

3GPP TS 24.501 v15.0.0. 3GPP; TSGCNT; NAS protocol for 5GS; Stage 3 (Release 15) Jun. 15, 2018 (Year: 2018).*

(Continued)

*Primary Examiner* — Gary Lafontant
(74) *Attorney, Agent, or Firm* — The Farrell Law Firm, P.C.

(57) ABSTRACT

The present disclosure relates to a 5G or pre-5G communication system for supporting a higher data transfer rate beyond a 4G communication system such as LTE. A terminal according to an embodiment of the present disclosure performs the operations of: transmitting a registration request message to a network node; receiving an authentication request message containing information on a security related capability from the network node; verifying the security related capability by using the authentication request message; transmitting a first message as a response to the authentication request message; receiving a security mode command message from the network node; and transmitting, to the network node, a security mode completion message as a response to the security mode command message, wherein the information on the security related capability includes information on a capability related to security between the terminal and the network node.

15 Claims, 7 Drawing Sheets

(56) References Cited

U.S. PATENT DOCUMENTS

| | | |
|---|---|---|
| 2011/0142239 A1 | 6/2011 | Suh et al. |
| 2013/0329653 A1 | 12/2013 | Russell, Jr. et al. |
| 2015/0365822 A1 | 12/2015 | Sharma |
| 2018/0176973 A1 | 6/2018 | Kim et al. |

OTHER PUBLICATIONS

3GPP TS 33.501 v15.1.0. 3GPP; TSGSSA; Security architecture and procedures for 5G system (Release 15). Jun. 21, 2018 (Year: 2018).*
PCT/ISA/210 Search Report issued on PCT/KR2019/007831, dated Oct. 2, 2019, pp. 5.
PCT/ISA/237 Written Opinion issued on PCT/KR2019/007831, dated Oct. 2, 2019, pp. 6.
3GPP TS 24.501 v15.0.0, Jun. 15, 2018, pp. 339, 3rd Generation Partnership Project; Technical Specification Group Core Network and Terminals; Non-Access-Stratum (NAS) protocol for 5 System (5GS); Stage 3 (Release 15).
3GPP TS 33.501 v15.1.0, Jun. 21, 2018, pp. 154, 3rd Generation Partnership Project; Technical Specification Group Services and System Aspects; Security architecture and procedures for 5G system (Release 15).
KR Decision of Grant dated Jul. 19, 2022 issued in counterpart application No. 10-2018-0076081, 6 pages.

* cited by examiner

METHOD AND DEVICE FOR COMMUNICATING IN WIRELESS COMMUNICATION SYSTEM

PRIORITY

This application is a National Phase Entry of PCT International Application No. PCT/KR2019/007831, which was filed on Jun. 27, 2019, and claims priority to Korean Patent Application No. 10-2018-0076081, which was filed on Jun. 29, 2018, the contents of each of which are incorporated herein by reference.

TECHNICAL FIELD

The disclosure relates to a method and an apparatus for transmitting and receiving data in a wireless communication system, and more particularly to a scheme for processing security capabilities of a UE and a network node as a security scheme used for transmission and reception of data between the UE and the network node, a method of preventing processing by the UE or the network node at a level lower than their security processing capabilities, and an apparatus for performing the same.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

DETAILED DESCRIPTION OF THE INVENTION

Technical Problem

In a 5G communication system, an Access and mobility Management Function (AMF), which is a management entity for managing the mobility of a UE, and a Session Management Function (SMF), which is an entity for managing a session, are separately embodied.

Unlike an operation manner in which a Mobile Management Entity (MME) manages both the mobility and the session in a 4G LTE communication system, entities for managing the mobility and the session are separated in the 5G communication system, and thus a communication scheme and a communication management scheme between a UE and a network entity are changed in accordance therewith.

In the 5G communication system, for non-3GPP access, mobility management is performed through the AMF and session management is performed through the SMF via a N3 Interworking Function (N3IWF). Further, through the AFM, not only the mobility management but also security-related information, which is an important element for mobility management, are handled.

Accordingly, in communication between the UE and the network node to handle security-related information, the UE and the network node need a communication method suitable for their own security capabilities and a method of overcoming security vulnerabilities due to communication at a level lower than security capabilities thereof.

Therefore, the disclosure proposes a method of preventing the UE and the network node from security-related vulnerabilities due to communication at a level lower than security capabilities thereof in the 5G communication.

Technical Solution

In accordance with an aspect of the disclosure, a method of performing communication by a UE may include: transmitting a registration request message including information indicating a security-related capability to a network node; receiving an authentication request message from the network node; verifying the security-related capability, based on the authentication request message; transmitting a first message to the network node in response to the authentication request message; receiving a security mode command message from the network node; and transmitting a security mode complete message to the network node in response to the security mode command message.

Advantageous Effects

According to an embodiment of the disclosure, it is possible to perform communication with enhanced security by transmitting security information in connection with security between a UE and a network and efficiently performing procedures related to security information transmission in a wireless communication system.

MODE FOR CARRYING OUT THE INVENTION

Figure 1:
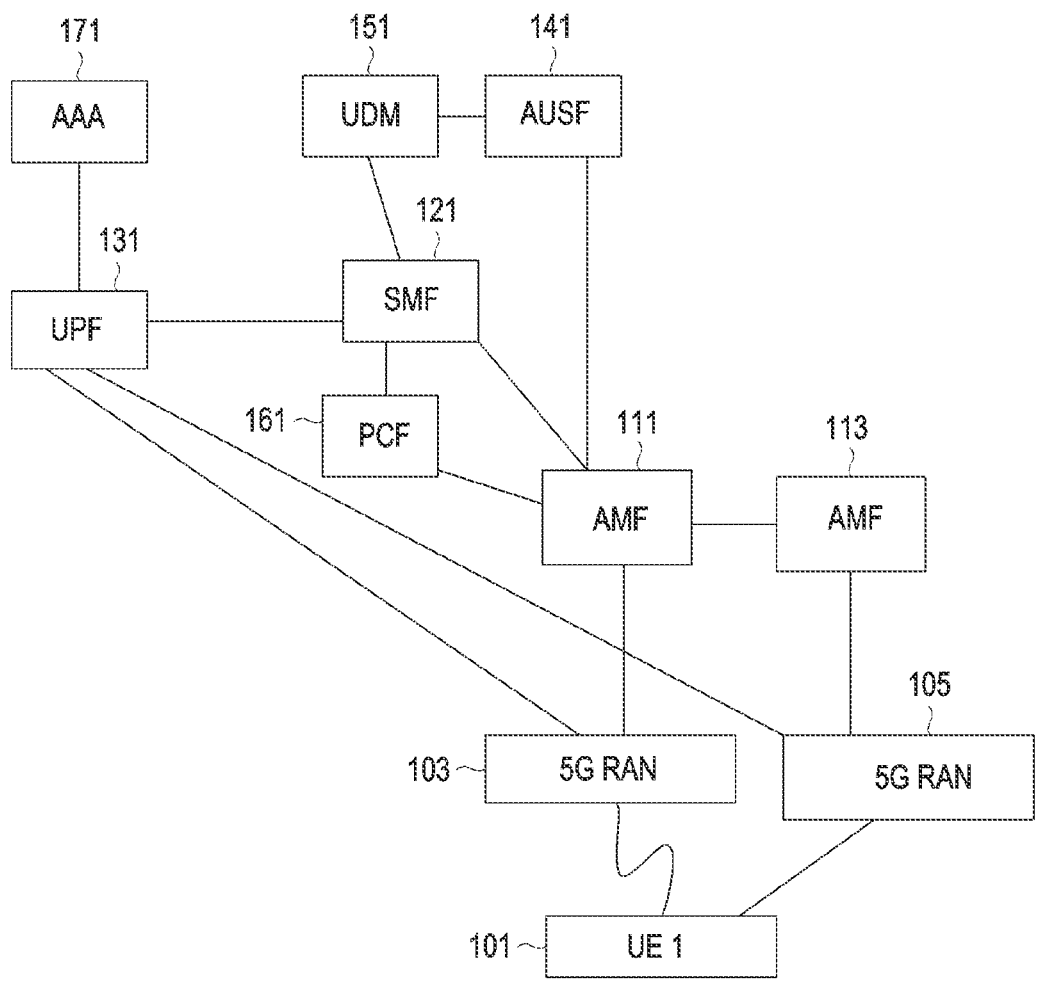
FIG. 1 illustrates a network environment of a 5G system according to an embodiment of the disclosure.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the standards for 5G, LTE systems for the convenience of description. However, the disclosure is not limited by these terms and names, and may be applied in the same way to systems that conform other standards.

That is, the detailed description of embodiments of the disclosure will be directed to communication standards defined by the 3rd generation partnership project (3GPP), but based on determinations by those skilled in the art, the main idea of the disclosure may also be applied to other communication systems having similar backgrounds or channel types through some modifications without significantly departing from the scope of the disclosure.

FIG. 1 illustrates a network environment of a 5G system according to an embodiment of the disclosure.

The embodiment of the disclosure assumes a 5G network. According to an embodiment, the 5G network may include a User-Plane Function (UPF) 131, a Session Management Function (SMF) 121, an Access and mobility Management Function (AMF) 111 and 113, a 5G Radio Access Network (RAN) 103, User Data Management (UDM) 151, a Policy Control Function (PCF) 161, and a User Equipment (UE 1) 101. Meanwhile, for authentication of entities, an Authentication Server Function (AUSF) 141 and Authentication, Authorization, and Accounting (AAA) 171 may also be included in the system.

Meanwhile, for the case in which the UE communicates through non-3GPP access, an N3 Interworking Function (N3IWF) exists. Through non-3GPP access, session management is controlled by the UE, the non-3GPP access, the N3IWF, and the SMF, and mobility management is controlled by the UE, the non-3GPP access, the N3IWF, and the AMF.

It is assumed that the communication network based on embodiments of the disclosure is a 5G network, but the content herein may be applied when the same concept is applied to other systems within the range that those skilled in the art can understand.

Figure 2:
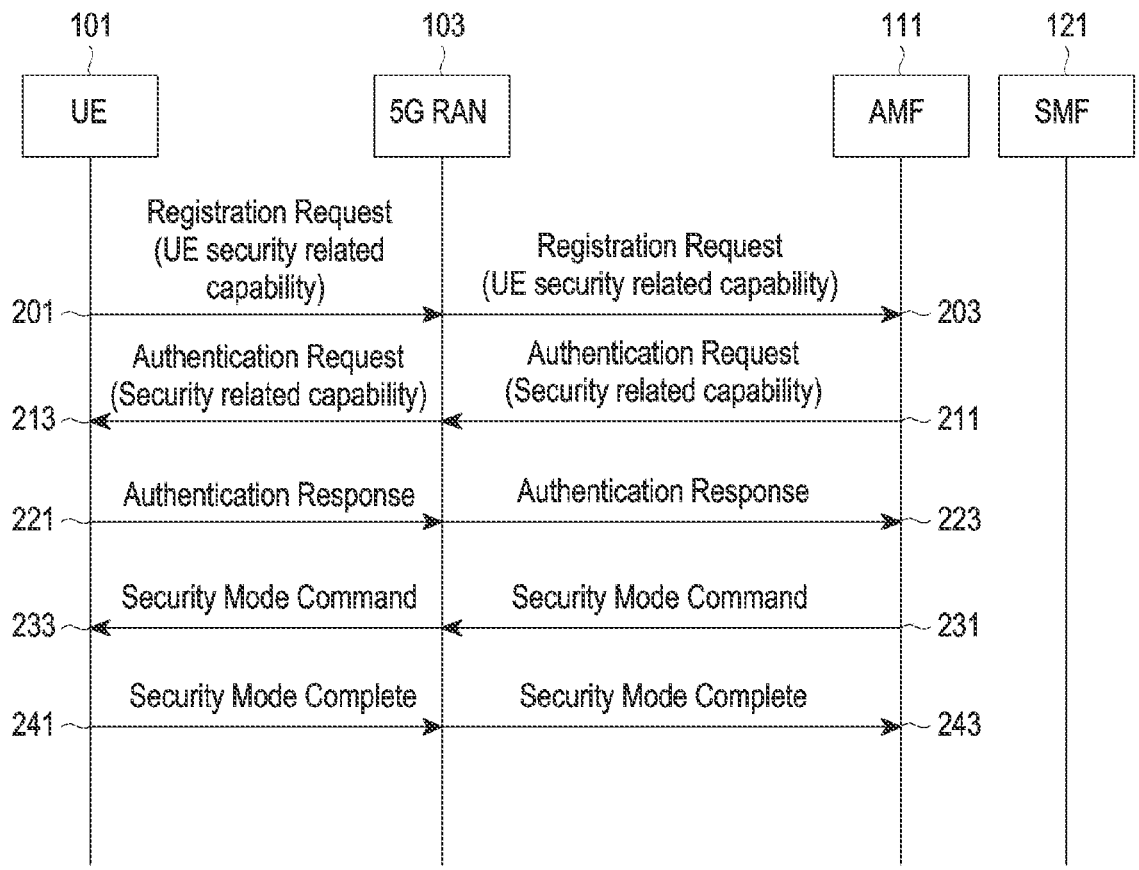
FIG. 2 illustrates an embodiment of a security procedure and a security method in communication of a 5G system according to an embodiment of the disclosure.

FIG. 2 illustrates an embodiment of a security procedure and a security method in communication of a 5G system according to an embodiment of the disclosure.

Specifically, FIG. 2 illustrates an embodiment in which a process of verifying a security-related capability (security-related parameter) is successful.

A network node is, for example, the AMF 111 in an embodiment of the disclosure, but is not limited thereto.

In processes 201 and 203, the UE 101 transmits a registration request message to the AMF 111. At this time, the UE 101 transmits information on a UE security-related capability to the network. The UE security-related capability is a security-related capability related to, for example, protection from security attacks in communication between the UE 100 and the network, and may include a security key generation capability of the UE.

Case A) A registration request may be configured as shown in [Table 1] in an embodiment.

In this case, a security-related capability information element of the UE is transmitted from the UE to the network.

TABLE 1

| IEI | Information Element | Type/Reference | Presence | Format | Length |
|---|---|---|---|---|---|
| | Extended protocol discriminator | Extended Protocol discriminator | M | V | 1 |
| | Security header type | Security header type | M | V | 1/2 |
| | Spare half octet | Spare half octet | M | V | 1/2 |
| | Registration request message identity | Message type | M | V | 1 |
| | 5GS registration type | 5GS registration type | M | LV | 2 |
| | ngKSI | NAS key set identifier | M | V | 1/2 |
| | Spare half octet | Spare half octet | M | V | 1/2 |
| | 5GS mobile identity | 5GS mobile identity | M | LV | 5-TBD |
| | UE Security related capability | UE Secutity related capability | M | LV | 3-n |
| C- | Non-current native NAS key set identifier | NAS key set identifier | O | TV | 1 |

TABLE 1-continued

| IEI | Information Element | Type/Reference | Presence | Format | Length |
|---|---|---|---|---|---|
| 10 | 5GMM capability | 5GMM capability | O | TLV | 3-15 |
| 2E | UE security capability | UE security capability | O | TLV | 4-6 |
| 2F | Requested NSSAI | NSSAI | O | TLV | 4-74 |
| 52 | Last visited registered TAI | 5GS tracking area identity | O | TV | 7 |
| 65 | S1 UE network capability | S1 UE network capability | O | TLV | 4-15 |
| 40 | Uplink data status | Uplink data status | O | TLV | 4-34 |
| 50 | PDU session status | PDU session status | O | TLV | 4-34 |
| B- | MICO indication | MICO indication | O | TV | |
| 2B | UE status | UE status | O | TLV | 3 |
| 2C | Additional GUTI | 5GS mobile identity | O | TLV | TBD |
| 25 | Allowed PDU session status | Allowed PDU session status | O | TLV | 4-34 |
| 60 | UE's usage setting | UE's usage setting | O | TLV | 3 |
| TBD | Requested DRX parameters | DRX parameters | O | TBD | TBD |
| 7C | EPS NAS message container | EPS NAS message container | O | TLV-E | TBD |
| 77 | Payload container | Payload container | O | TLV-E | 4-65538 |

The UE security-related capability information element included in [Table 1] may be configured as shown in [Table 2].

TABLE 2

| 8 | 7 | 6 | 5 | 4 | 3 | 2 | 1 | |
|---|---|---|---|---|---|---|---|---|
| UE Security related capability IEI | | | | | | | | octet 1 |
| length of UE security related capability | | | | | | | | octet 2 |
| UE Security related capability | | | | | | | | octets 3-n |

The UE security-related capability information element may be used in the following cases.

Case 1) The UE security-related capability information element may be used to inform the AMF of the security-related capability of the UE. When the UE generates a security-related key, the information element may indicate whether a Kamf should be derived from a Kseaf (SEAF: security anchor function).

Case 2) When the UE moves from the AMF to another AMF, that is, a target AMF, the target AMF may be informed of the UE capability in another embodiment.

Case 3) The UE may trigger the AMF to fetch the key from the SEAF in another embodiment. That is, when the UE moves, the UE may perform triggering by transmitting the security-related capability to allow the target AMF to fetch the key generated by the SEAF from the SEAF.

After transmitting the security-related capability of the UE, the UE may continuously perform communication in the current AMF. Alternatively, when the UE performs handover to a target AMF or when the UE moves in an idle mode, the UE may transmit a security-related capability to the network. When generation of a key by the SEAF on the basis of the security-related capability is supported by the corresponding network, communication that guarantees suitable security, for example, mobility-management-related security, within the limits allowed by the UE capability is possible according to the capability supported by the network.

According to an embodiment of the disclosure, at least a portion of the UE security-related capability may be configured or analyzed as shown in [Table 3].

TABLE 3

UE Security related capability (octet 3 to octet n)

The security related capability consists of:
  UE security related capability (2 octet);
  Freshness related parameter (1 octet)

Case B)
The registration request may be configured as shown in [Table 4] in another embodiment.

In this case, the security-related capability information element of the UE is transmitted from the UE to the network.

TABLE 4

| IEI | Information Element | Type/Reference | Presence | Format | Length |
|---|---|---|---|---|---|
| | Extended protocol discriminator | Extended Protocol discriminator | M | V | 1 |
| | Security header type | Security header type | M | V | 1/2 |
| | Spare half octet | Spare half octet | M | V | 1/2 |
| | Registration request message identity | Message type | M | V | 1 |
| | 5GS registration type | 5GS registration type | M | LV | 2 |
| | ngKSI | NAS key set identifier | M | V | 1/2 |
| | Spare half octet | Spare half octet | M | V | 1/2 |
| | 5GS mobile identity | 5GS mobile identity | M | LV | 5-TBD |
| C- | Non-current native NAS key set identifier | NAS key set identifier | O | TV | 1 |
| 10 | 5GMM capability | 5GMM capability | O | TLV | 3-15 |
| 2E | UE security capability | UE security capability | O | TLV | 4-6 |
| 2F | Requested NSSAI | NSSAI | O | TLV | 4-74 |
| 52 | Last visited registered TAI | 5GS tracking area identity | O | TV | 7 |
| 65 | S1 UE network capability | S1 UE network capability | O | TLV | 4-15 |
| 40 | Uplink data status | Uplink data status | O | TLV | 4-34 |
| 50 | PDU session status | PDU session status | O | TV | 1 |
| B- | MICO indication | MICO indication | O | TLV | 3 |
| 2B | UE status | UE status | O | TLV | TBD |
| 2C | Additional GUTI | 5GS mobile identity | O | TLV | 4-34 |
| 25 | Allowed PDU session status | Allowed PDU session status | O | TLV | 3 |
| 60 | UE's usage setting | UE's usage setting | O | TBD | TBD |
| TBD | Requested DRX parameters | DRX parameters | O | TLV-E | TBD |
| 7C | EPS NAS message container | EPS NAS message container | O | TLV-E | 4-65538 |
| 77 | Payload container | Payload container | O | TLV | 3-n |
| | UE security related capability | UE security related capability | | | |

Case c) The registration request may be configured as shown in [Table 5] in another embodiment of UE+Network. In this case, the security-related capability (the security-related capability information elements of the UE and the network) is transmitted from the UE to the network.

In order to enable transmission of the information (security-related capability information element), the UE is also required to have information on the security-related capability of the network when the UE performs handover or moves in an idle-mode state in an example. The reception of the information by the network may be reception of a message having the security-related capability information element by the AMF 111 in an example. The message may correspond to a registration request message in an embodiment. The AMF 111 receiving the message becomes aware of information on the capability of the UE 101 to generate the security-related key transmitted thereby and information on the AMF 111 that the UE 101 knows. Accordingly, after receiving the information, the AMF 111 may verify information on the security capability supported by the AMF 111 and the security capability for the AMF of which the UE 101 is aware. Further, through this verification process, the AMF may recognize the security capability supported by the UE within the security capability supported by the network, and may then perform a security procedure corresponding to an authentication process. Meanwhile, the verification is not limited to being performed by the AMF 111, but may be performed by, for example, the UE 101.

TABLE 5

| IEI | Information Element | Type/Reference | Presence | Format | Length |
|---|---|---|---|---|---|
|  | Extended protocol discriminator | Extended Protocol discriminator | M | V | 1 |
|  | Security header type | Security header type | M | V | 1/2 |
|  | Spare half octet | Spare half octet | M | V | 1/2 |
|  | Registration request message identity | Message type | M | V | 1 |
|  | 5GS registration type | 5GS registration type | M | LV | 2 |
|  | ngKSI | NAS key set identifier | M | V | 1/2 |
|  | Spare half octet | Spare half octet | M | V | 1/2 |
|  | 5GS mobile identity | 5GS mobile identity | M | LV | 5-TBD |
|  | Security related capability | Security related capability | M | LV | 3-n |
| C- | Non-current native NAS key set identifier | NAS key set identifier | O | TV | 1 |
| 10 | 5GMM capability | 5GMM capability | O | TLV | 3-15 |
| 2E | UE security capability | UE security capability | O | TLV | 4-6 |
| 2F | Requested NSSAI | NSSAI | O | TLV | 4-74 |
| 52 | Last visited registered TAI | 5GS tracking area identity | O | TV | 7 |
| 65 | S1 UE network capability | S1 UE network capability | O | TLV | 4-15 |
| 40 | Uplink data status | Uplink data status | O | TLV | 4-34 |
| 50 | PDU session status | PDU session status | O | TLV | 4-34 |
| B- | MICO indication | MICO indication | O | TV | 1 |
| 2B | UE status | UE status | O | TLV | 3 |
| 2C | Additional GUTI | 5GS mobile identity | O | TLV | TBD |
| 25 | Allowed PDU session status | Allowed PDU session status | O | TLV | 4-34 |
| 60 | UE's usage setting | UE's usage setting | O | TLV | 3 |
| TBD | Requested DRX parameters | DRX parameters | O | TBD | TBD |
| 7C | EPS NAS message container | EPS NAS message container | O | TLV-E | TBD |
| 77 | Payload container | Payload container | O | TLV-E | 4-65538 |

The UE security-related capability information element included in [Table 5] may be configured as shown in [Table 6].

TABLE 6

| 8 | 7 | 6 | 5 | 4 | 3 | 2 | 1 | |
|---|---|---|---|---|---|---|---|---|
| Security related capability IEI ||||||||octat 1 |
| Length of secutity related capability ||||||||octat 2 |
| Security related capability ||||||||octats 3-n |

At least a portion of the security-related capability information element included in the embodiment may be configured or analyzed as shown in [Table 7].

TABLE 7

| UE Security related capability (octet 3 to octet n) |
|---|
| The security related capability consists of: UE security related capability (2 octet); The network related capability (2 octet); and Freshness related parameter (1 octet) |

That is, at least a portion of the security-related capability information element may include a UE security-related capability, a network-related security capability, and a freshness-related parameter.

The UE security-related capability may be used in the following cases.

Case 1) The UE security-related capability may be used to inform the AMF of the security-related capability of the UE. When the UE generates a security-related key, the information element may indicate whether a Kamf should be derived from a Kseaf.

Case 2) When the UE moves from the AMF to another AMF, that is, a target AMF, the target AMF may be informed of the UE capability in another embodiment.

Case 3) The UE may trigger the AMF to fetch the key from the SEAF in another embodiment. That is, when the UE moves, the UE may trigger the AMF to fetch the key generated by the SEAF from the SEAF by transmitting the security-related capability.

After transmitting the security-related capability of the UE, the UE may continuously perform communication in the current AMF. Alternatively, when the UE performs handover to a target AMF or when the UE moves in an idle mode, the UE may transmit a security-related capability to the network. When generation of a key by the SEAF on the basis of the security-related capability is supported by the corresponding network, communication that guarantees suitable security, for example, mobility-management-related security, within the limits of the UE capability is possible according to the capability supported by the network.

According to an embodiment, the network-security-related capability in the security-related capability may transmit information corresponding to at least one of the following cases.

Case 1) Information on whether the AMF generates a security key in an initial version of the network (AMF)

Case 2) Information on whether the SEAF generates the key and fetches and transmits the key to the AMF when the SEAF is supported Case 3) Information on whether the SEAF fetches and transmits the key to the AMF when the SEAF is supported Case 3-1) Information on whether the SEAF fetches the key generated by a source AMF to allow a target AMF to use the key Case 3-2) Information on whether the SEAF receives triggering from the source AMF or the target AMF, generates the key, and transmits the key to the target AMF to allow the target AMF to use the same.

The UE receiving the information may know that the AMF, with which the UE will communicate or is communicating, has security-related capability and may perform communication with reference to the UE security capability within the security capability supported by the AMF in subsequent communication.

The freshness-related parameter may include a counter number, a nonce, or a sequence number.

According to an embodiment, in the case of a UE security parameter transmitted by the UE, the freshness-related parameter may be a counter number, a nonce, or a sequence number when transmitted by the UE.

According to an embodiment, in the case of a UE/network security parameter transmitted by the network, the freshness-related parameter may be a counter number, a nonce, or a sequence number when transmitted by the network.

Case D) The registration request may be configured as shown in [Table 8] in another embodiment of UE+network. In this case, the security-related capability information elements of the UE and the network are transmitted from the UE to the network.

TABLE 8

| IEI | Information Element | Type/Reference | Presence | Format | Length |
|---|---|---|---|---|---|
| | Extended protocol discriminator | Extended Protocol discriminator | M | V | 1 |
| | Security header type | Security header type | M | V | 1/2 |
| | Spare half octet | Spare half octet | M | V | 1/2 |
| | Registration request message identity | Message type | M | V | 1 |
| | 5GS registration type | 5GS registration type | M | LV | 2 |
| | ngKSI | NAS key set identifier | M | V | 1/2 |
| | Spare half octet | Spare half octet | M | V | 1/2 |
| | 5GS mobile identity | 5GS mobile identity | M | LV | 5-TBD |
| C- | Non-current native NAS key set identifier | NAS key set identifier | O | TV | 1 |
| 10 | 5GMM capability | 5GMM capability | O | TLV | 3-15 |
| 2E | UE security capability | UE security capability | O | TLV | 4-6 |
| 2F | Requested NSSAI | NSSAI | O | TLV | 4-74 |
| 52 | Last visited registered TAI | 5GS tracking area identity | O | TV | 7 |
| 65 | S1 UE network capability | S1 UE network capability | O | TLV | 4-15 |
| 40 | Uplink data status | Uplink data status | O | TLV | 4-34 |
| 50 | PDU session status | PDU session status | O | TLV | 4-34 |
| B- | MICO indication | MICO indication | O | TV | 1 |
| 2B | UE status | UE status | O | TLV | 3 |
| 2C | Additional GUTI | 5GS mobile identity | O | TLV | TBD |
| 25 | Allowed PDU session status | Allowed PDU session status | O | TLV | 4-34 |
| 60 | UE's usage setting | UE's usage setting | O | TLV | 3 |
| TBD | Requested DRX parameters | DRX parameters | O | TBD | TBD |
| 7C | EPS NAS message container | EP NAS message container | O | TLV-E | TBD |
| 77 | Payload container | Payload container | O | TLV-E | 4-65538 |
| | Security related capability | Security related capability | O | TLV | 3-n |

In processes 211 and 213 of FIG. 2, the AMF 111 transmits an authentication request message to the UE 101. At this time, the network node (for example, the AMF) transmits the security-related capability of the UE, the security-related capability of the network node, and information on the freshness of the security information.

Case A) Mandatory Field

The authentication request message according to an embodiment may be configured as shown in [Table 9].

TABLE 9

| IEI | Information Element | Type/Reference | Presence | Format | Length |
|---|---|---|---|---|---|
| | Extended protocol discriminator | Extended Protocol discriminator | M | V | 1 |
| | Security header type | Security header type | M | V | 1/2 |
| | Spare half octet | Spare half octet | M | V | 1/2 |
| | Authentication request message identity | Message type | M | V | 1 |
| | ngKSI | NAS key set identifier | M | V | 1/2 |
| | Spare half octet | Spare half octet | M | V | 1/2 |
| | Security related capability | Security related capability | M | LV | 3-n |
| 21 | Authentication parameter RAND (5G authentication challenge) | Authentication parameter RAND | O | TV | 17 |
| 20 | Authentication parameter AUTN (5G authentication challenge) | Authentication parameter AUTN | O | TLV | 18 |
| 78 | EAP message | EAP message | O | TLV-E | 7-1503 |

The security-related capability information element included in [Table 9] may be configured to have a length of at least 3 octets, as shown in [Table 10].

TABLE 10

| 8 | 7 | 6 | 5 | 4 | 3 | 2 | 1 | |
|---|---|---|---|---|---|---|---|---|
| Security related capability IEI | | | | | | | | octet 1 |
| Length of secutity related capability | | | | | | | | octet 2 |
| Security related capability | | | | | | | | octets 3-n |

According to an embodiment of the disclosure, at least a portion of the security-related capability information element may be configured or analyzed as shown in [Table 11].

TABLE 11

| Security related capability (octet 3 to octet n) |
|---|
| The security related capability consists of: UE security related capability (2 octet); The network related capability (2 octet); and Freshness related parameter (1 octet) |

That is, at least a portion of the security-related capability may include a UE security-related capability, a network-related security capability, and a freshness-related parameter.

The security-related capability may be used in the following cases.

Case 1) The security-related capability may be used to inform the AMF of the security-related capability of the UE. When the UE generates a security-related key, the information element may indicate whether a Kamf should be derived from a Kseaf.

Case 2) When the UE moves from the AMF to another AMF, that is, a target AMF, the target AMF may be informed of the UE capability in another embodiment.

Case 3) The UE may trigger the AMF to fetch the key from the SEAF in another embodiment. That is, when the UE moves, the UE may trigger the AMF to fetch the key generated by the SEAF from the SEAF by transmitting the security-related capability.

After transmitting the security-related capability of the UE, the UE may continuously perform communication in the current AMF. Alternatively, when the UE performs handover to a target AMF or when the UE moves in an idle mode, the UE may transmit a security-related capability to the network. When generation of a key by the SEAF on the basis of the security-related capability is supported by the corresponding network, communication that guarantees suitable security, for example, mobility-management-related security, within the limits of the UE capability is possible according to the capability supported by the network.

According to an embodiment, the network-security-related capability may transmit information corresponding to at least one of the following cases.

Case 1) Information on whether the AMF generates a security key in an initial version of the network (AMF), Case 2) Information on whether the SEAF generates a key and fetches and transmits the key to the AMF when the SEAF is supported, and Case 3) Information on whether the SEAF fetches and transmits the key to the AMF when the SEAF is supported, Case 3-1) Information on whether the SEAF fetches the key generated by a source AMF to allow a target AMF to use the key, and Case 3-2) Information on whether the SEAF receives triggering from the source AMF or the target AMF, generates the key, and transmits the key to the target AMF to allow the target AMF to use the same.

The UE receiving the information may know that the AMF, with which the UE will communicate or is communicating, has security-related capability and may perform communication with reference to the UE security capability within the security capability supported by the AMF in subsequent communication.

The freshness-related parameter may include a counter number, a nonce, or a sequence number.

According to an embodiment, in the case of a UE security parameter transmitted by the UE, the freshness-related parameter may be a counter number, a nonce, or a sequence number when transmitted by the UE.

According to an embodiment, in the case of a UE/network security parameter transmitted by the network, the freshness-related parameter may be a counter number, a nonce, or a sequence number when transmitted by the network.

The network transmitting the security-related capability information element and the UE receiving the same may derive the Kamf on the basis of information on the information element.

Function code=scheduled to be determined
P0=SUPI
L0=length of SUPI
PI=value of security related value (value of the security-related capability)
L1=length of security-related parameter The PI value may be set to 0 and transmitted by the AMF when the functions of the SEAF and the AMF are collocated in an embodiment. Alternatively, in key derivation of the SEAF and the AMF, case 1) in which the SEAF alone generates a Kamf from a Kseaf, case 2) in which the AMF alone generates a Kamf, or case 3) in which the SEAF and the AMF are collocated and generate a Kamf may be an embodiment in which a PI value is set to 0 and transmitted.

Case B) An authentication request message according to another embodiment may be configured as shown in [Table 12].

TABLE 12

| IEI | Information Element | Type/Reference | Presence | Format | Length |
|---|---|---|---|---|---|
| | Extended protocol discriminator | Extended Protocol discriminator | M | V | 1 |
| | Security header type | Security header type | M | V | 1/2 |
| | Spare half octet | Spare half octet | M | V | 1/2 |
| | Authentication request message identity | Message type | M | V | 1 |
| | ngKSI | NAS key set identifier | M | V | 1/2 |
| | Spare half octet | Spare half octet | M | V | 1/2 |
| 21 | Authentication parameter RAND (5G authentication challenge) | Authentication parameter RAND | O | TV | 17 |
| 20 | Authentication parameter AUTN (5G authentication challenge) | Authentication parameter AUTN | O | TLV | 18 |
| 78 | EAP message | EAP message | O | TLV-E | 7-1503 |
| | Security related capability | Security related capability | O | TLV | 3-n |

[Table 12] shows the case in which the security-related capability is added in the form of an optional information element.

In processes 221 and 223 of FIG. 2, the UE 101 transmits an authentication response message to the AMF 111. This case corresponds to the case in which authentication is successful.

Thereafter, in processes 231 and 233, the AMF 111 transmits a security mode command message to the UE 101.

In processes 241 and 243, the UE 101 transmits a security mode complete message to the AMF 111.

Figure 3:
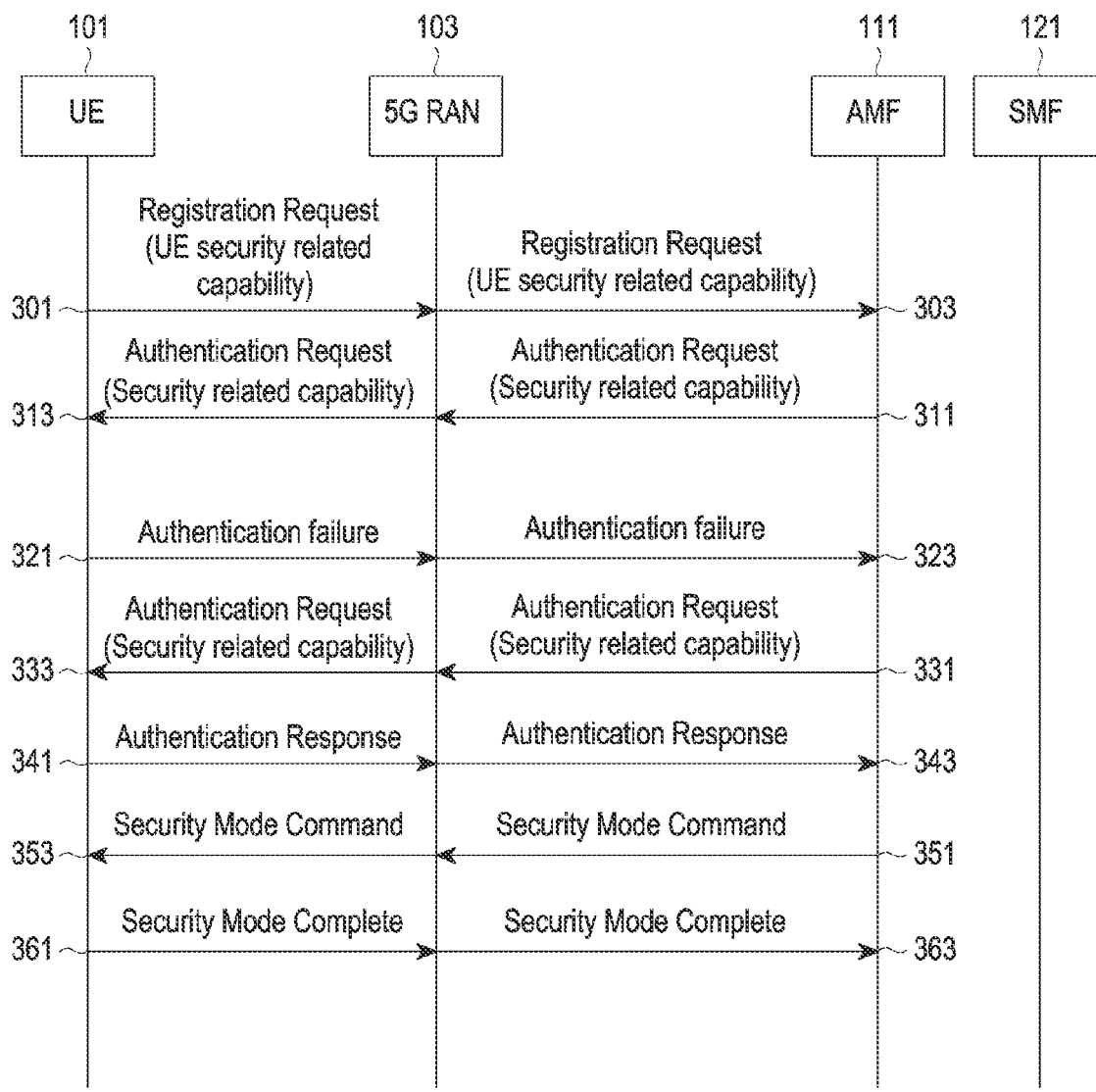
FIG. 3 illustrates an embodiment of a security procedure and a security method in communication of a 5G system according to an embodiment of the disclosure.

FIG. 3 illustrates an embodiment of a security procedure and a security method in the 5G system according to an embodiment of the disclosure.

Specifically, FIG. 3 illustrates an embodiment in which a process of verifying a security-related capability (security-related parameter) fails.

In processes 301 and 303, the UE 101 transmits a registration request message to the AMF 111. At this time, the UE 101 transmits information on a UE security-related capability to the network. The UE security-related capability may include the security key generation capability of the UE.

Thereafter, in processes 311 and 313, the AMF 111 transmits an authentication request message to the UE 101. At this time, the network node (for example, the AMF) transmits the security-related capability of the UE, the security-related capability of the network node, and information on freshness of the security information.

The UE 101 may fail in verifying the security-related capability transmitted by the UE itself and the security-related capability transmitted by the network. When failing in the verification, the UE 101 transmits an authentication failure message to the AMF 111 in processes 321 and 323.

In processes 331 and 333, the AMF 111 transmits an authentication request message to the UE 101. At this time, the UE 101 transmits information on a UE security-related capability to the network. The UE security-related capability may include the security key generation capability of the UE.

Thereafter, when authentication succeeds, the UE 101 transmits an authentication response message to the AMF 111 in processes 341 and 343.

In processes 351 and 353, the AMF 111 transmits a security mode command message to the UE 101.

In processes 361 and 363, the UE 101 transmits a security mode complete message to the AMF 111.

Figure 4:
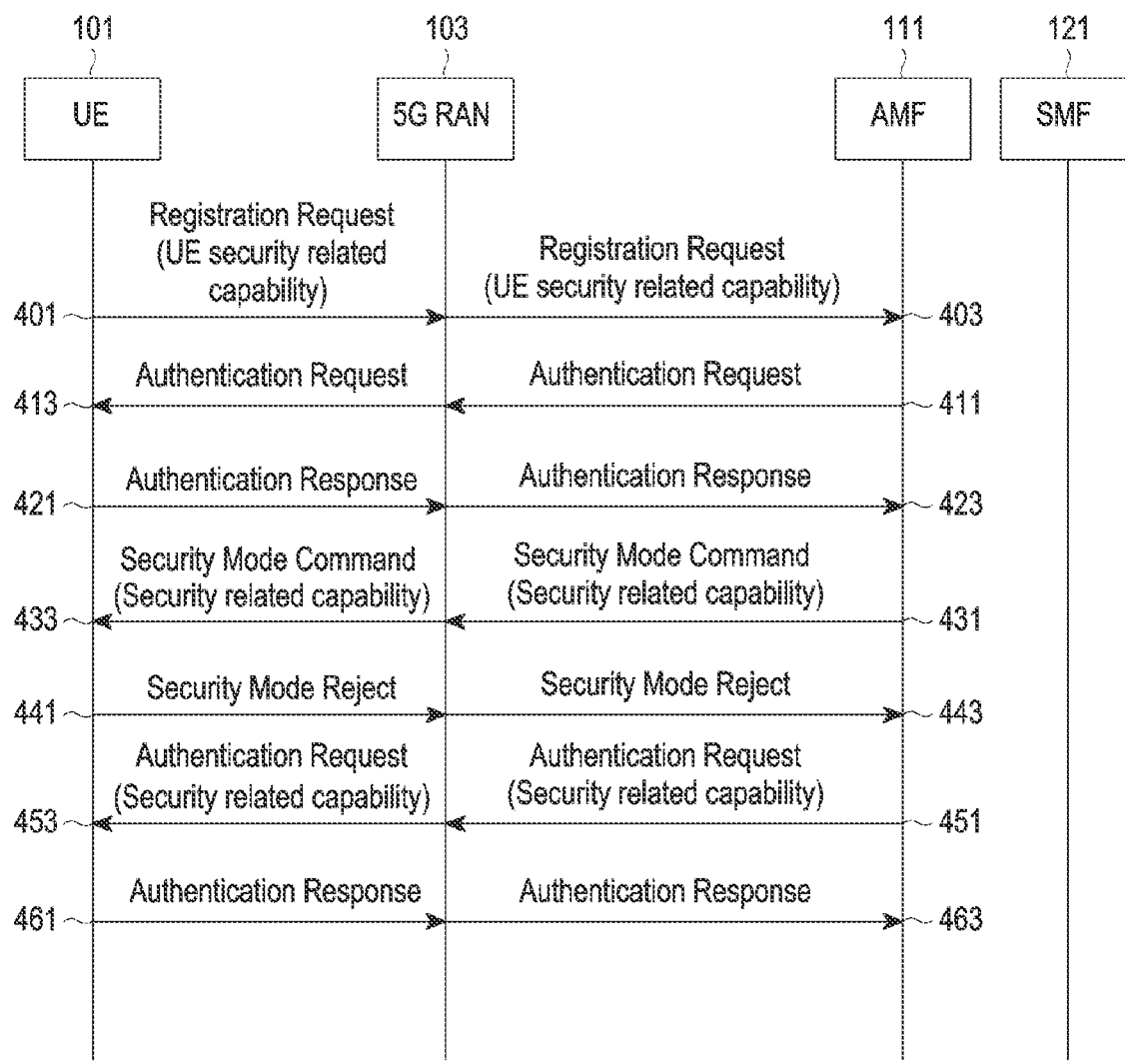
FIG. 4 illustrates an embodiment of a security procedure and a security method in communication of a 5G system according to an embodiment of the disclosure.

FIG. 4 illustrates an embodiment of a security procedure and a security method in the 5G system according to an embodiment of the disclosure.

Specifically, FIG. 4 illustrates an embodiment in which a security-related capability verification process fails.

In processes 401 and 403, the UE 101 transmits a registration request message to the AMF 111.

Thereafter, in processes 411 and 413, the AMF 111 transmits an authentication request message to the UE 101. At this time, the network node (for example, the AMF) transmits the security-related capability of the UE, the security-related capability of the network node, and information on freshness of the security information.

Thereafter, in processes 421 and 423, the UE 101 transmits an authentication response message to the AMF 111.

In processes 431 and 433, the AMF 111 transmits a security mode command message to the UE 101.

At this time, the UE 101 transmits information on UE security-related capability to the network. The UE security-related capability may include the security key generation capability of the UE.

The security mode command message may be configured in the form shown in [Table 13] or [Table 14]. [Table 13] includes a security-related information element as a mandatory feature. [Table 14] includes a security-related information element as an optional feature.

Case 1)

TABLE 13

| IEI | Information Element | Type/Reference | Presence | Format | Length |
|---|---|---|---|---|---|
| | Extended protocol discriminator | Extended Protocol discriminator | M | V | 1 |
| | Security header type | Security header type | M | V | 1/2 |
| | Spare half octet | Spare half octet | M | V | 1/2 |
| | Security mode command message identity | Message type | M | V | 1 |
| | Selected NAS security algorithms | NAS security algorithms | M | V | 1 |
| | ngKSI | NAS key set identifier | M | V | 1/2 |
| | Spare half octet | Spare half octet | M | V | 1/2 |
| | Replayed UE security capabilities | UE security capability | M | LV | 3-5 |
| | Security related capability | Security related capability | M | LV | 3-n |
| E- | IMEISV request | IMEISV request | O | TV | 1 |
| 4F | HashAMF | HashAMF | O | TV | 9 |
| 57 | Selected EPS NAS security algorithms | EPS NAS security algorithms | O | TV | 2 |
| 78 | EAP message | EAP message | O | TLV-E | 7 |

Case 2)

TABLE 14

| IEI | Information Element | Type/Reference | Presence | Format | Length |
|---|---|---|---|---|---|
| | Extended protocol discriminator | Extended Protocol discriminator | M | V | 1 |

TABLE 14-continued

| IEI | Information Element | Type/Reference | Presence | Format | Length |
|---|---|---|---|---|---|
| | Security header type | Security header type | M | V | 1/2 |
| | Spare half octet | Spare half octet | M | V | 1/2 |
| | Security mode command message identity | Message type | M | V | 1 |
| | Selected NAS security algorithms | NAS security algorithms | M | V | 1 |
| | ngKSI | NAS key set identifier | M | V | 1/2 |
| | Spare half octet | Spare half octet | M | V | 1/2 |
| | Replayed UE security capabilities | UE security capability | M | LV | 3-5 |
| E- | IMEISV request | IMEISV request | O | TV | 1 |
| 4F | HashAMF | HashAMF | O | TV | 9 |
| 57 | Selected EPS NAS security algorithms | EPS NAS security algorithms | O | TV | 2 |
| 78 | EAP message | EAP message | O | TLV-E | 7 |
| | Security related capability | Security related capability | O | TLV | 3-n |

The security-related capability information element included in [Table 13] or [Table 14] may be configured as shown in [Table 15].

TABLE 15

| 8 | 7 | 6 | 5 | 4 | 3 | 2 | 1 | |
|---|---|---|---|---|---|---|---|---|
| Security related capability IEI | | | | | | | | octet 1 |
| Length of secutity related capability | | | | | | | | octet 2 |
| Security related capability | | | | | | | | octets 3-n |

At least a portion of the security-related capability information element may be configured or analyzed as shown in [Table 16].

TABLE 16

| UE Security related capability (octet 3 to octet n) |
|---|
| The security related capability consists of: UE security related capability (2 octet); The network security related capability (2 octet); and Freshness related paramete (1 octet) |

That is, at least a portion of the security-related capability may include a UE security-related capability, a network-related security capability, and a freshness-related parameter.

Case 1) The UE security-related capability may be used to inform the AMF of the security-related capability of the UE. When the UE generates a security-related key, the information element may indicate whether a Kamf should be derived from a Kseaf.

Case 2) When the UE moves from the AMF to another AMF, that is, a target AMF, the target AMF may be informed of the UE capability in another embodiment.

Case 3) The UE may trigger the AMF to fetch the key from the SEAF in another embodiment. That is, when the UE moves, the UE may trigger the AMF to fetch the key generated by the SEAF from the SEAF by transmitting the security-related capability.

After transmitting the security-related capability of the UE, the UE may continuously perform communication in the current AMF. Alternatively, when the UE performs handover to a target AMF or when the UE moves in an idle mode, the UE may transmit a security-related capability to the network. When generation of a key by the SEAF on the basis of the security-related capability is supported by the corresponding network, communication that guarantees suitable security, for example, mobility-management-related security, within the limits of the UE capability is possible according to the capability supported by the network.

According to an embodiment, the network-security-related capability may transmit information corresponding to at least one of the following cases.

Case 1) Information on whether the AMF generates a security key in an initial version of the network (AMF)

Case 2) Information on whether the SEAF generates the key and fetches and transmits the key to the AMF when the SEAF is supported Case 3) Information on whether the SEAF fetches and transmits the key to the AMF when the SEAF is supported Case 3-1) Information on whether the SEAF fetches the key generated by a source AMF to allow a target AMF to use the key Case 3-2) Information on whether the SEAF receives triggering from the source AMF or the target AMF, generates the key, and transmits the key to the target AMF to allow the target AMF to use the same.

The UE receiving the information may know that the AMF, with which the UE will communicate or is communicating, has security-related capability and may perform communication with reference to the UE security capability within the security capability supported by the AMF in subsequent communication.

The freshness-related parameter may include a counter number, a nonce, or a sequence number.

According to an embodiment, in the case of a UE security parameter transmitted by the UE, the freshness-related parameter may be a counter number, a nonce, or a sequence number when transmitted by the UE.

According to an embodiment, in the case of a UE/network security parameter transmitted by the network, the freshness-related parameter may be a counter number, a nonce, or a sequence number when transmitted by the network.

The network transmitting the security-related capability information element and the UE receiving the same may derive the Kamf on the basis of information on the information elements.

Function code=scheduled to be determined

P0=SUPI

L0=length of SUPI

PI=value of security related value (value of the security-related capability)

L1=length of security-related parameter

The PI value may be set to 0 and transmitted by the AMF when the functions of the SEAF and the AMF are collocated in an embodiment. Alternatively, in key derivation of the SEAF and the AMF, case 1) in which the SEAF alone generates a Kamf from a Kseaf, case 2) in which the AMF alone generates a Kamf, or case 3) in which the SEAF and the AMF are collocated and generate a Kamf may be an embodiment in which a PI value is set to 0 and transmitted.

In processes 441 and 443, the UE 101 transmits a security mode reject message to the AMF 111.

Thereafter, in processes 451 and 453, the AMF 111 transmits an authentication request message to the UE 101.

In processes 461 and 463, the UE 101 transmits an authentication response message to the AMF 111.

Figure 5:
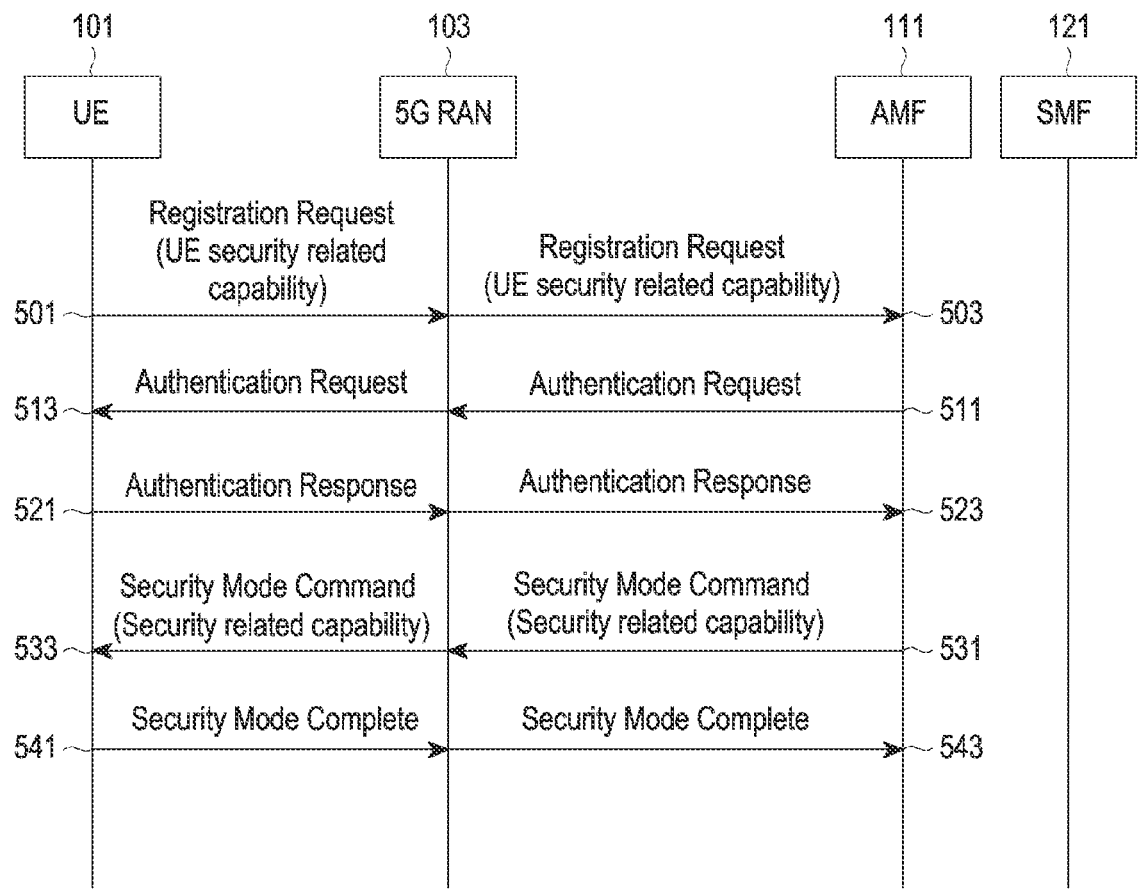
FIG. 5 illustrates an embodiment of a security procedure and a security method in communication of a 5G system according to an embodiment of the disclosure.

FIG. 5 illustrates an embodiment of a security procedure and a security method in the 5G system according to an embodiment of the disclosure.

Specifically, FIG. 5 illustrates an embodiment in which a process of verifying a security-related capability is successful.

In processes 501 and 503, the UE 101 transmits a registration request message to the AMF 111.

Thereafter, in processes 511 and 513, the AMF 111 transmits an authentication request message to the UE 101. At this time, the network node (for example, the AMF) transmits the security-related capability of the UE, the security-related capability of the network node, and information on freshness of the security information.

In processes 521 and 523, the UE 101 transmits an authentication response message to the AMF 111.

In processes 531 and 533, the AMF 111 transmits a security mode command message to the UE 101.

At this time, the UE 101 transmits information on UE security-related capability to the network. The UE security-related capability may include the security key generation capability of the UE.

In processes 541 and 543, the UE 101 transmits a security mode complete message to the AMF 111.

Figure 6:
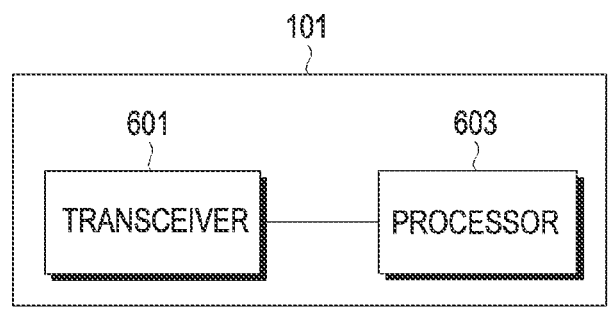
FIG. 6 is a block diagram of a UE according to an embodiment of the disclosure.

FIG. 6 is a block diagram of a UE according to an embodiment of the disclosure.

The UE 101 may include a transceiver 601 and a processor 603.

For example, the processor 603 may control the transceiver 601 to transmit and receive a message related to a security procedure.

Figure 7:
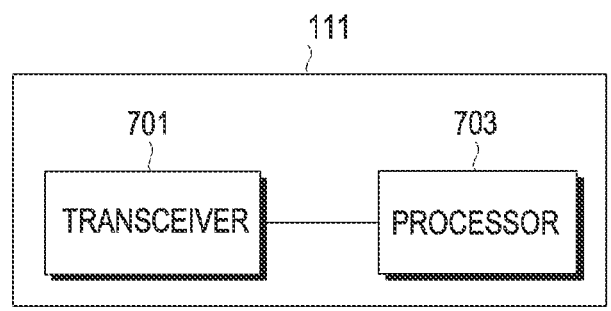
FIG. 7 is a block diagram of a network node according to an embodiment of the disclosure.

FIG. 7 is a block diagram of a network node according to an embodiment of the disclosure.

The network node may be, for example, a BS or the AMF 111.

The network node may include a transceiver 701 and a processor 703.

For example, the processor 703 may control the transceiver 701 to transmit and receive a message related to a security procedure.

Figure 8:
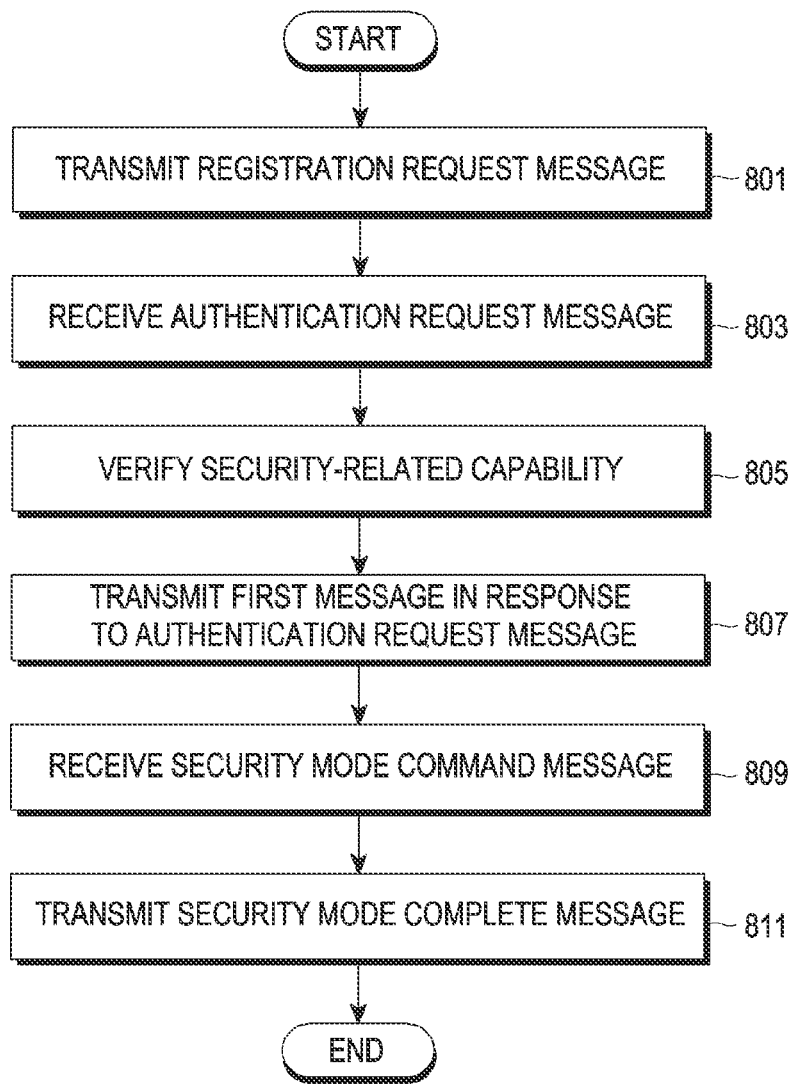
FIG. 8 is a flowchart illustrating an embodiment of a security procedure and a security method in communication of the 5G system according to an embodiment of the disclosure.

FIG. 8 is a flowchart illustrating an embodiment of a security procedure and a security method in communication of the 5G system according to an embodiment of the disclosure.

Referring to FIG. 8, the UE 101 may transmit a registration request message including information indicating a security-related capability to the network node in step 801, receive an authentication request message from the network node in step 803, and verify (authenticate) the security-related capability on the basis of the authentication request message in step 805. The UE 101 may transmit a first message in response to the authentication request message in step 807, receive a security mode command message from the network node in step 809, and transmit a security mode complete message to the network node in response to the security mode command message in step 811. The security-related capability may include at least one of the security-related capability of the UE or the security-related capability of the network node.

The first message may be an authentication response message or an authentication failure message according to success or failure of verification (authentication).

In the detailed embodiments of the disclosure, elements included in the disclosure are expressed in a singular or plural form according to the presented detailed embodiment. However, the singular form or plural form is selected for suitability of description of the presented situation, and the various embodiments are not limited to a single element or multiple elements thereof. Further, either multiple elements expressed in the description may be configured into a single element, or a single element in the description may be configured into multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of performing communication by a UE in a wireless communication system, the method comprising:
    transmitting, to a network node, a registration request message;
    receiving, from the network node, an authentication request message including information on a security-related capability and information on freshness of the security-related capability, wherein the information on the security-related capability includes security-related capability of the UE and security-related capability of the network node;
    verifying the security-related capability, based on the authentication request message;
    transmitting a first message in response to the authentication request message;
    receiving, from the network node, a security mode command message; and
    transmitting, to the network node, a security mode complete message in response to the security mode command message,
    wherein the information on freshness of the security-related capability is a counter number, a nonce, or a sequence number.

2. The method of claim 1, wherein transmitting the first message in response to the authentication request message comprises transmitting an authentication response message when verifying the security-related capability is successful.

3. The method of claim 1, wherein transmitting the first message in response to the authentication request message comprises transmitting an authentication failure message when verifying the security-related capability fails.

4. The method of claim 1, wherein the information on the security-related capability includes information on a security key generation capability.

5. The method of claim 1, wherein the network node is an Access and mobility Management Function (AMF).

6. A method of performing communication by a network node in a wireless communication system, the method comprising:
    receiving, from a UE, a registration request message;
    transmitting, to the UE, an authentication request message including information on a security-related capability and information on freshness of the security-related capability, wherein the information on the security-related capability includes security-related capability of the UE and security-related capability of the network node;
    receiving a first message in response to the authentication request message;
    transmitting, to the UE, a security mode command message; and
    receiving, from the UE, a security mode complete message in response to the security mode command message,
    wherein the UE performs verification of the security-related capability based on the authentication request message, and
    wherein the information on freshness of the security-related capability is a counter number, a nonce, or a sequence number.

7. The method of claim 6, wherein the first message includes an authentication response message when the UE succeeds in verifying the security-related capability.

8. The method of claim 6, wherein the first message includes an authentication failure message when the UE fails in verifying the security-related capability.

9. The method of claim 6, wherein the information on the security-related capability includes information on a security key generation capability.

10. The method of claim 6, wherein the network node is an Access and mobility Management Function (AMF).

11. A UE in a wireless communication system, the UE comprising:
    a transceiver; and
    a processor connected to the transceiver, wherein the processor is configured to control to:
        transmit, to a network node, a registration request message,
        receive, from the network node, an authentication request message including information on a security-related capability and information on freshness of the security-related capability, wherein the information on the security-related capability includes security-related capability of the UE and security-related capability of the network node,
        verify the security-related capability, based on the authentication request message,
        transmit a first message in response to the authentication request message,
        receive, from the network node, a security mode command message, and
        transmit, to the network node, a security mode complete message in response to the security mode command message,
    wherein the information on freshness of the security-related capability is a counter number, a nonce, or a sequence number.

12. The UE of claim 11, wherein the first message includes an authentication response message when the UE succeeds in verifying the security-related capability, and includes an authentication failure message when the UE fails in verifying the security-related capability.

13. The UE of claim 11, wherein the information on the security-related capability includes information on a security key generation capability.

14. A network node in a wireless communication system, the network node comprising:
    a transceiver; and
    a processor connected to the transceiver, wherein the processor is configured to control to:
        receive, from a UE, a registration request message,
        transmit, to the UE, an authentication request message including information on a security-related capability and information on freshness of the security-related capability, wherein the information on the security-related capability includes security-related capability of the UE and security-related capability of the network node,
        receive a first message in response to the authentication request message,
        transmit, to the UE, a security mode command message, and receive, from the UE, a security mode complete message in response to the security mode command message, wherein the UE verifies the security-related capability, based on the authentication request message, and wherein the information on freshness of the security-related capability is a counter number, a nonce, or a sequence number.

15. The network node of claim 14, wherein the first message includes an authentication response message when the UE succeeds in verifying the security-related capability and includes an authentication failure message when the UE fails in verifying the security-related capability, and the information on the security-related capability includes information on a security key generation capability.

* * * * *